(12) United States Patent
Zhu

(10) Patent No.: US 8,315,124 B2
(45) Date of Patent: Nov. 20, 2012

(54) SYSTEM AND METHOD FOR SUPPRESSION OF SEISMIC MULTIPLE REFLECTION SIGNALS

(75) Inventor: Weihong Zhu, Dharhran (SA)

(73) Assignee: Saudi Arabian Oil Company, Dhahran (SA)

( * ) Notice: Subject to any disclaimer, the term of this patent is extended or adjusted under 35 U.S.C. 154(b) by 442 days.

(21) Appl. No.: 12/460,565

(22) Filed: Jul. 20, 2009

(65) Prior Publication Data

US 2011/0013483 A1 Jan. 20, 2011

(51) Int. Cl.
*G01V 1/00* (2006.01)
(52) U.S. Cl. .............................. 367/73; 367/38
(58) Field of Classification Search .................. 367/37, 367/38, 43, 73
See application file for complete search history.

(56) References Cited

U.S. PATENT DOCUMENTS

| | | | |
|---|---|---|---|
| 3,603,922 A * | 9/1971 | Hair et al. ...................... 367/43 |
| RE30,347 E * | 7/1980 | Musgrave ....................... 367/51 |
| 4,760,563 A | 7/1988 | Beylkin |
| 4,884,248 A | 11/1989 | Laster et al. |
| 5,978,314 A | 11/1999 | Pham .............................. 367/52 |
| 6,018,500 A * | 1/2000 | Chambers ....................... 367/73 |
| 6,094,620 A | 7/2000 | Gasparotto et al. |
| 6,446,009 B1 * | 9/2002 | Baeten et al. .................. 702/17 |
| 6,636,810 B1 | 10/2003 | Moore et al. |
| 6,763,304 B2 | 7/2004 | Schonewille |
| 6,873,913 B2 * | 3/2005 | Choo et al. ..................... 702/17 |
| 6,987,706 B2 | 1/2006 | Wood |
| 7,031,223 B2 | 4/2006 | Kinkead |
| 7,136,079 B2 | 11/2006 | Luo et al. |
| 2005/0180262 A1 | 8/2005 | Robinson ........................ 367/47 |
| 2006/0190181 A1 | 8/2006 | Deffenbaugh ................. 702/14 |
| 2007/0064535 A1 | 3/2007 | Burnstad |
| 2007/0076525 A1 * | 4/2007 | Craft et al. ...................... 367/38 |

OTHER PUBLICATIONS

Stanford, "What is seismic noise?", May 5, 2005.*
Kelamis et al., "Land Multipe Attenuation—The Future is Bright", SEG Expanded Abstracts 25 (2006), pp. 1-4.*
Insight—Prestack 16, "Filtering," http://www.geop.ubc.ca/seismology/insight/prestack16.html, printed May 23, 2007, pp. 1-33.
Kelamis, Panos G., Zhu, Weihong, Rufaii, Khalid O. and Luo, Yi, "Land Multiple Attenuation—The Future is Bright," SEG Expanded Abstracts 25 (2006), pp. 1-4.
Zhang, J. and Wang, W., "Multiple Attenuation: An approach by incorporating multiple prediction with radon transform", Journal of Seismic Exploration (2006) vol. 15 (No. 1), pp. 81-99.

(Continued)

*Primary Examiner* — Isam Alsomiri
*Assistant Examiner* — Krystine Breier
(74) *Attorney, Agent, or Firm* — Abelman, Frayne & Schwab

(57) ABSTRACT

A method of modeling seismic wave-field data in order to suppress near-surface and sub-surface related multiple reflection signals is provided. The reflection signals include main primary reflection signals, main random noise signals, main multiple reflection signals, residual primary reflection signals, residual random noise signals, and residual multiple reflection signals. Main random noise signals are separated from the reflection signals using a frequency-wavenumber domain method to provide data having suppressed main random noise. Main primary reflection signals are separated from the data having suppressed main random noise using frequency-wavenumber filtering and weighted median filtering to provide data having suppressed main random noise and main primary reflections. Multiple reflection signals are modeled using parabolic path summation on the data having suppressed main random noise and main primary reflections.

6 Claims, 10 Drawing Sheets

OTHER PUBLICATIONS

Cao, Zhihong and Bancroft, John C., "A Semblance Weighted Radon Transform on Multiple Attenuation," CSEG National Convention, 2005, pp. 1-4.

Cao, Zhihong (Nancy) and Bancroft, John C., "Multiple attenuation by semblance weighted Radon Transform," CREWES Research Report, vol. 16 (2004), pp. 1-10.

Landa, Evgeny, "Imaging without a velocity model using path-summation approach," SEG Int'l Exposition and 74th Annual Meeting, Denver, Colorado Oct. 10-15, 2004, pp. 1-4.

Schonewille, Michel, et al., "High-resolution transform and amplitude preservation," EAGE 64th Conference & Exhibition—Florence, Italy (2002), pp. 1-4.

Sacchi, M.D. and Porsani, M., "Fast high resolution parabolic Radon transform," SEG Expanded Abstracts (1999), pp. 1-4.

Cary, P.W., "The simplest discrete Radon transform," SEG Expanded Abstracts (1998), pp. 1-4.

PCT/ISR dated Sep. 13, 2010 (2 pages).

\* cited by examiner

SYSTEM AND METHOD FOR SUPPRESSION OF SEISMIC MULTIPLE REFLECTION SIGNALS

RELATED APPLICATIONS

[Not applicable]

BACKGROUND OF THE INVENTION

1. Field of the Invention

This invention relates to suppression of seismic multiple reflection signals, and more particularly to a method and system for modeling land-based seismic wave-field data.

2. Description of Related Art

Exploration for subterranean natural resources, such as oil and gas, commonly employs the generation of controlled seismic signals, gathering reflected signals, and processing the reflected signals and to yield information about the subterranean formations. The reflected signals, known as "seismic reflections," or simply "reflections," are detected by sensors or receivers typically located at or near the earth's surface, in an overlaying body of water, or at known depths in boreholes. The information from reflections is derived from what are known as "primary" reflections, which are acoustic reflections caused by subsurface anomalies, e.g., variations in elastic properties of rock formations or other underground features. The seismic data is recorded and processed to output mappings of an area of interest, including three-dimensional representations of the geological formations.

Collection of seismic data by receivers occurs over a period of about 1 to about 12 seconds immediately following generation of a down-going seismic energy pulse, such as from one or more detonated explosions or seismic vibration sources. The data is collected over intervals of one to about four milliseconds. Therefore each receiver can collect thousands of returning seismic recordings related to a down-going seismic energy pulse. The data collected is commonly known as "seismic traces." In a typical seismic survey, which can involve thousands of individual receivers at known locations, millions of seismic traces are received, recorded and processed over a period of about six seconds.

Each seismic trace not only includes the desired primary reflections, but also includes random noise and undesirable "multiple reflection signals," also know as "multiples." Multiple reflections occur when a seismic wave reflects up at the location of a subsurface anomaly, reflects back down, and back up again. Further, multiples often reflect more than three times. Random noise and multiples obscure the primary reflections, thus making the seismic data very difficult to interpret, even by experienced geophysicists. Therefore, numerous techniques have been developed to minimize the impact of the unwanted data.

Conventional methodologies for providing usable data from reflection data are to input the collective data, including random noise, primary reflections and multiple reflections into a full data transform and convert it to another domain. However, in a full data transform, if the noise energy is excessive, it is difficult to mute only multiples in a computer-generated model. Since every sample in model space is a combination of noise, primaries and multiples, when a portion of a sample in model space is muted, all noise, primaries and multiples for all traces will be impacted accordingly.

The most utilized methods for multiples suppression are Radon filter-based methodologies. These are described, for example, by Moore, et al. in U.S. Pat. No. 6,636,810; Beylkin in U.S. Pat. No. 4,760,563; Gasparotto, et al. in U.S. Pat. No. 6,094,620; Sacchi in "Fast high resolution parabolic Radon transform," SEG Expanded Abstracts (1999); Cary in "The simplest discrete Radon transform," SEG Expanded Abstracts (1998); Schonewille et al. in "High-resolution transform and amplitude preservation," EAGE 64th Conference & Exhibition, Florence, Italy (2002); and Cao et al. in "A Semblance Weighted Radon Transform on Multiple Attenuation," CSEG National Convention (2005). All of these references describe modeling of multiples in full data multi-channel transforms.

The Radon-based methodologies do not account for special characteristics associated with land data. Land data, unlike marine data, is characterized by multiple arrivals that are neither continuous nor predictable due to near-surface and sub-surface anomalies. Radon transforms, along with Fourier and several other transforms, are typical tools available to geophysicists for modeling multiples. Land data is characterized with low signal-to-noise ratio. Unlike the marine environment, land has variable surface conditions which lead to the generation of various multiple events. Further, land data has a wide variety of noise, and land multiple are neither continuous nor predictable. Therefore, while multi-channel multiple suppression methods may be suitable for modeling marine-based seismic data, these methodologies tend to cause data smearing, which in turns lead to changes in the original texture of the seismic data. This is due to the fact that traditional methods use multi-channel transforms and model multiples directly from the low signal-to-noise ratio input data.

Therefore, a need exists for a method and system for modeling multiple reflections that is particularly suitable for land data.

Accordingly, it is an object of the present invention to provide a method and system for modeling the energy of multiple reflection signals in land data, which can be used to effectively model the primary reflection signals.

It is another object of the present invention to provide a method and system for modeling the energy of multiple reflection signals of land data without the detrimental effects associated with conventional approaches, such as data smearing.

SUMMARY OF THE INVENTION

The above objects and further advantages are provided by the system and method of the present invention for modeling the energy of multiple reflection signals in land data. A method of modeling seismic wave-field data in order to suppress near-surface and sub-surface related multiple reflection signals is provided. The reflection signals include main primary reflection signals, main random noise signals, main multiple reflection signals, residual primary reflection signals, residual random noise signals, and residual multiple reflection signals. Main random noise signals are separated from the reflection signals using a frequency-wavenumber domain method to provide data having suppressed main random noise. The frequency-wavenumber domain method generally suppresses low amplitude values. Main primary reflection signals are separated from the data having suppressed main random noise signals using frequency-wavenumber filtering and weighted median filtering to provide data having suppressed main random noise and suppressed main primary reflections. Frequency-wavenumber filtering is generally normal two dimensional filtering, e.g., to maintain the data in a fan shaped area. The energy of multiple reflection signals is modeled using parabolic path summation on the data having suppressed main random noise and main primary reflections.

Data in land seismic studies can be more complex than data in marine seismic studies. Common approaches of using Radon or Fourier transforms of the full data set directly on the input data, often cause data smearing because of the imperfections of the data and the methods. The system and method according to the present invention provides a more realistic model to separate the wave-field and utilizes a localized data set to model multiple reflection signals, thereby achieving more accurate and effective results.

In general, random noise signals and primary reflection signals are separated prior to modeling multiple reflection signals, resulting in the more accurate estimation of multiple reflection signals. Localized parabolic path-summation which works in the time domain, is used to model multiple reflection signals by estimating multiples trace by trace and sample by sample. For every sample of an input gather, a localized parabolic path summation is used to model the energy of that multiple reflection signal sample. The length of the parabolic path is generally about 7 to 31 points, i.e., the cross points of the path and the adjacent traces of that sample. There is no data transform used in modeling multiples. Therefore, the need for transforms while modeling multiple reflection signals is obviated.

Application of the method and system of the present invention retains the original character of the seismic data in terms of frequency and amplitude. The seismic wave-field data is separated into four main components: primary reflection signals, multiple reflection signals, random noise signals, and residual signals of the primaries, multiple reflection signals and random noise signals. Main random noise signals and primary reflection signals are separated prior to modeling multiples, thereby providing more accurate multiple models. A localized transform is used to model the energy of multiple reflection signals, which is subtracted from the original input data to provide a frequency-wavenumber spectrum having suppressed multiple reflections. Because of the inherent imperfection of the data and the algorithms, in the present invention, by separating the estimated main noise signals, main primary signals and modeled multiple reflection signals from the input data, residual data including residual noise signals, residual primary signals and residual multiple reflection signals is the resulting difference.

The present invention provides a more accurate and reliable modeling of wave-field seismic data, particularly data derived from land-based sources, as compared to conventional methods such as those based on Radon transforms. Whereas the prior art methods for suppression of multiple reflection signals assume that the seismic data (T) use two components, multiples (M) and non-multiples (O), to provide seismic data T=M+O, the system and method herein assumes a more realistic model for seismic data. Seismic wave-field (T) is decomposed into four main components: primary reflection signals (P), multiple reflection signals (M), random noise signals (N), and residuals of the primary reflection signals, the multiple reflection signals and the random noise signals (R=RP+RN+RM), such that the seismic wave-field is represented by: T=P+M+N+R.

BRIEF DESCRIPTION OF THE DRAWINGS

The invention will be described in further detail below and with reference to the attached drawings in which the same or similar elements are referred to by the same number, and where.

DETAILED DESCRIPTION OF THE INVENTION

Figure 1:
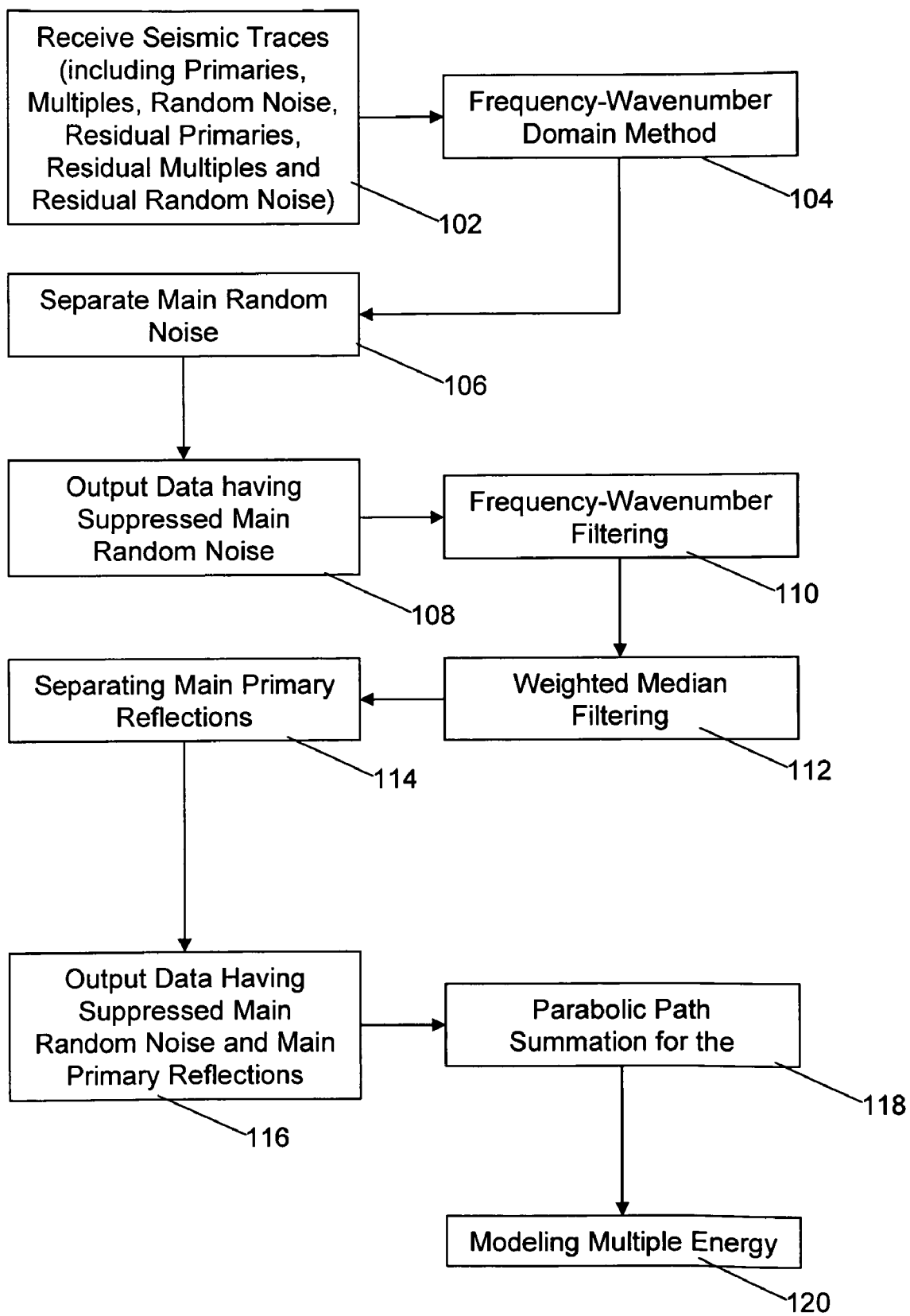
FIG. 1 is a flow diagram of a method for processing seismic data to model multiple reflection signals in accordance with the present invention.
Figure 3:
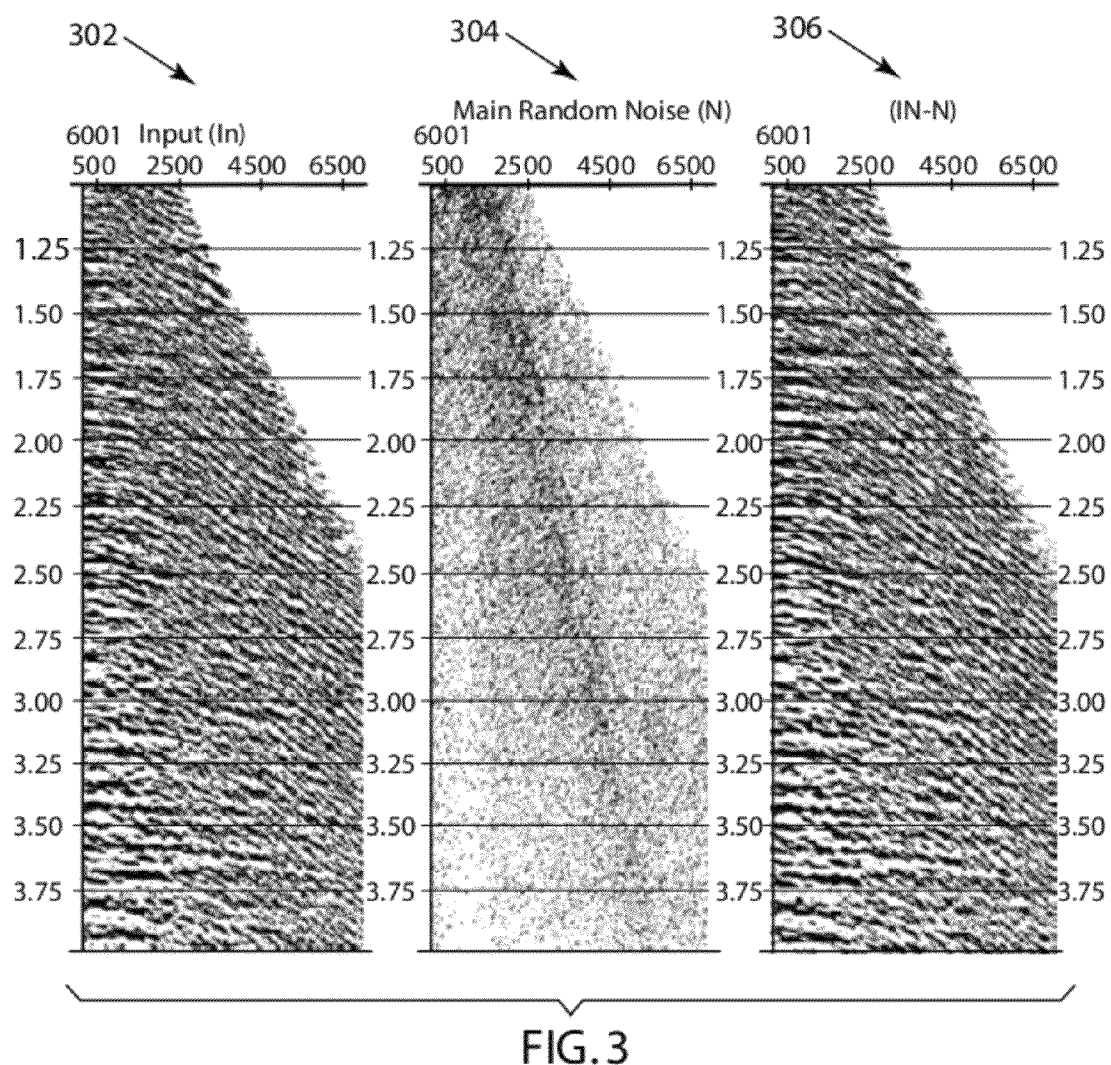
FIG. 3 illustrates stacked sections for the input data, main random noise signals and the decrement data having suppressed main random noise signals according to a first step of the method of the present invention.

A method of, and system for modeling seismic wave-field data having suppressed near-surface and sub-surface related multiple reflection signals are described, beginning with reference to FIG. 1, where seismic traces are received 102 from preprocessing operations and stored, for example, on one or more memory storage devices. The seismic data is field data obtained over several processing steps sorted in the common middle point domain with normal moveout correction applied. These seismic traces include main primary reflection signals, main random noise signals, main multiple reflection signals, residual primary reflection signals, residual random noise signals, and residual multiple reflection signals. A frequency-wavenumber (FK) domain method 104 is applied to the reflection signals to separate 106 main random noise signals and provide 108 data having suppressed main random noise signals. FIG. 3 illustrates gathers of the main random noise signals N 304 separated from input data IN 302 to provide decrement data IN-N 306 having suppressed random noise signals. The typical window size of the localized FK domain method is thirty-two traces and 500 milliseconds. The input data is divided into many windows with 50% overlap. All windows are combined after the localized FK domain method is applied. For the gathers and other information presented in FIGS. 3-7, the ordinates are time in seconds, and the abscissas are the offset, i.e., source-receiver distance, in meters.

Figure 4:
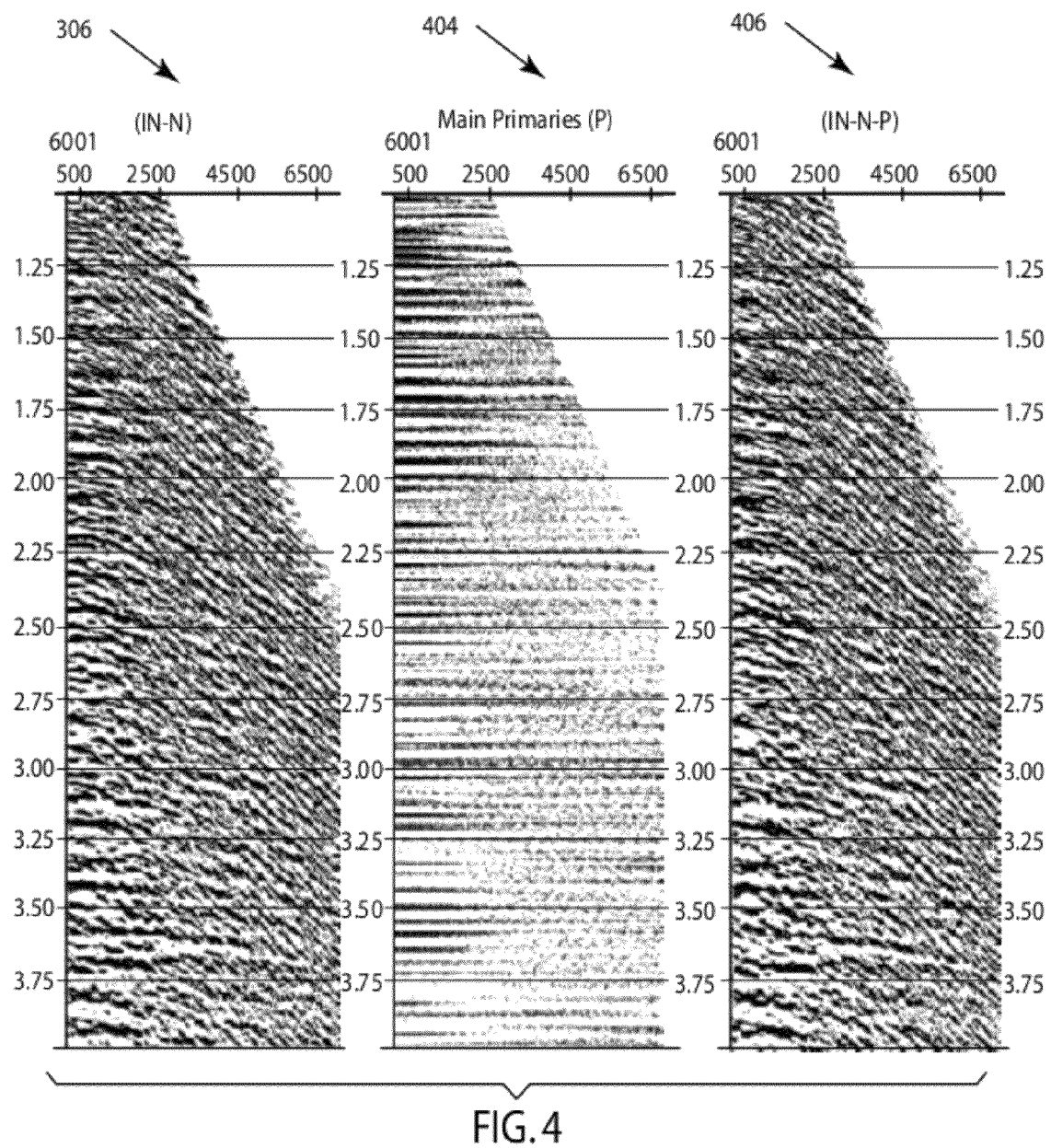
FIG. 4 illustrates the input gather having suppressed main random noise signals, main primary reflection signals, and the decrement data having suppressed main random noise signals and main primary reflection signals according to a second step of the method of the present invention.

With continued reference to FIG. 1, and also referring to FIG. 4, using FK filtering 110 performed in the FK domain and weighted median filtering 112 performed in the time-space domain (t-x), main primary reflection signals are separated 114 from the data having suppressed main random noise signals to provide 116 data having suppressed main random noise signals and main primary reflection signals. FIG. 4 shows gathers of the main primary reflection signals P 404 separated from the data IN-N 306 having suppressed random noise signals to provide the difference, data IN-N-P 406 having suppressed random noise signals and main primary reflection signals.

Figure 5:
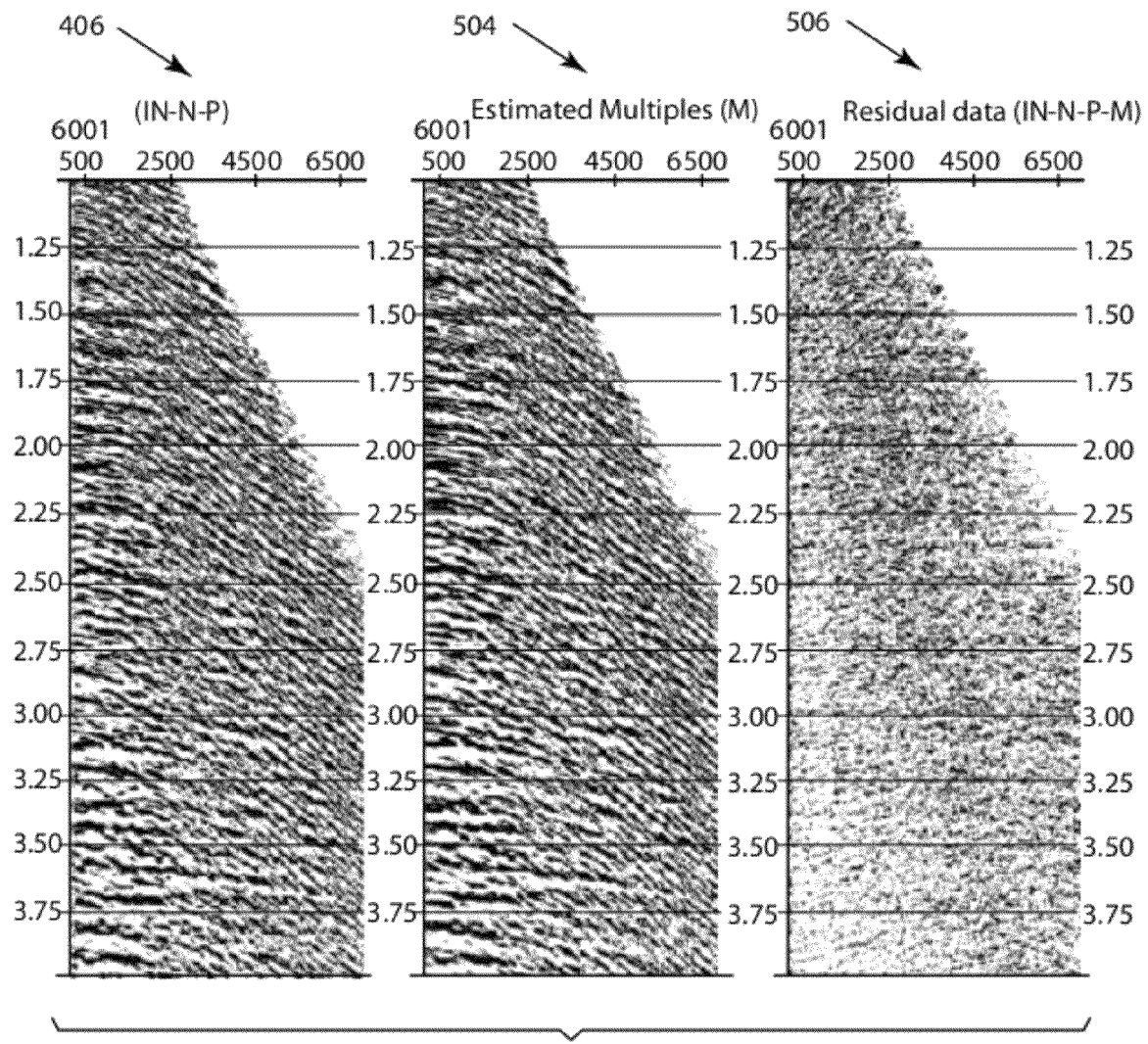
FIG. 5 illustrates the input gather having suppressed main random noise signals and main primary reflection signals, the estimated multiple reflection signals, and the decrement residual data according to a third step of the method of the present invention.
Figure 6:
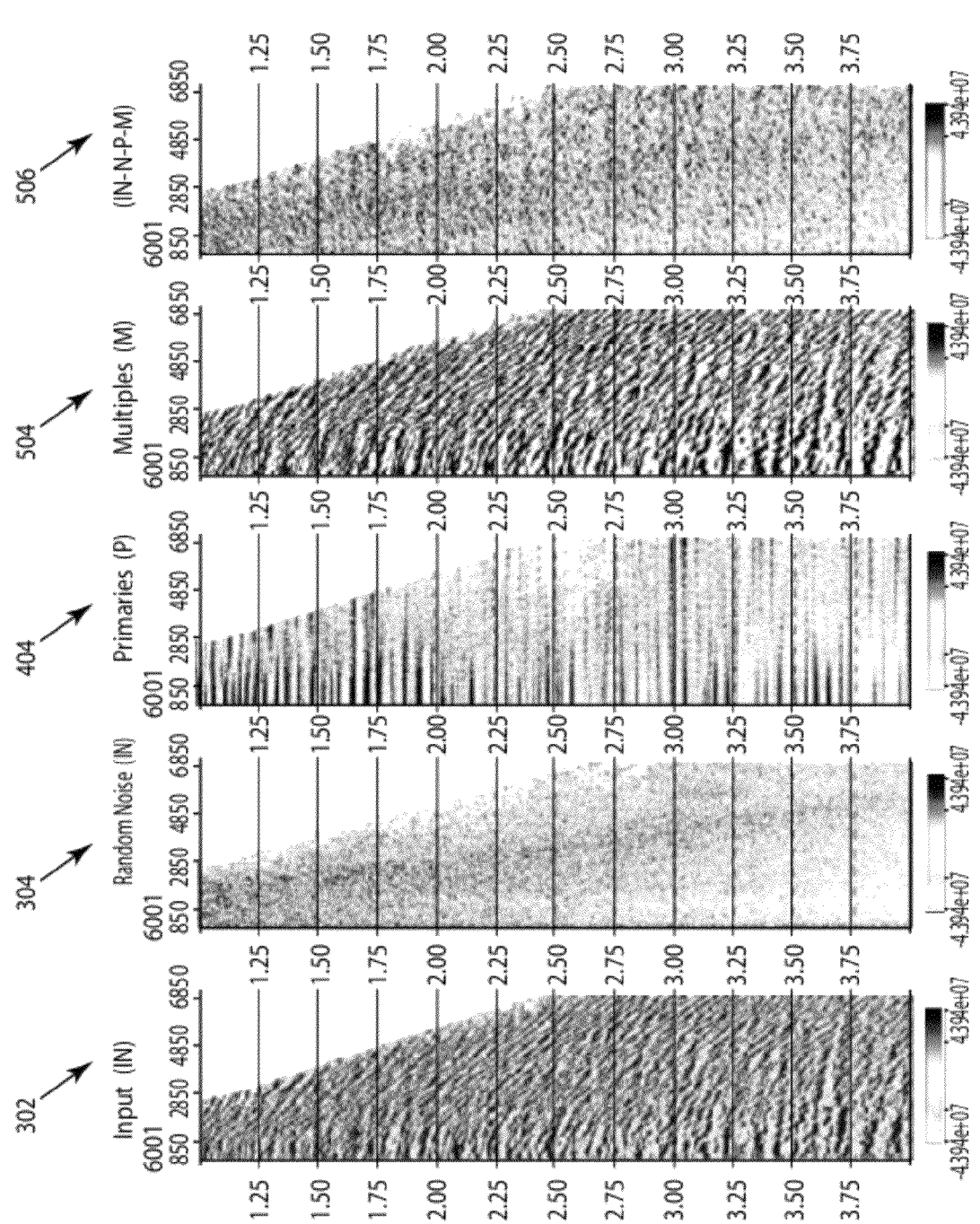
FIG. 6 illustrates the input gather and its four components used in the method of the present invention.

Energy of multiple reflection signals are modeled 120 using parabolic path summation 118 on the data having suppressed main random noise signals and main primary reflection signals. FIG. 5 shows gathers of the modeled primary reflection signals data 504 subtracted from the data IN-N-P 406 having suppressed random noise signals and main primary reflection signals to provide the residual data IN-N-P-M 506. FIG. 6 shows gathers of input data IN 302, main random noise signals N 304, main primary reflection signals P 404, multiple reflection signals M 504 and residual data IN-N-P-M 506.

Figure 2:
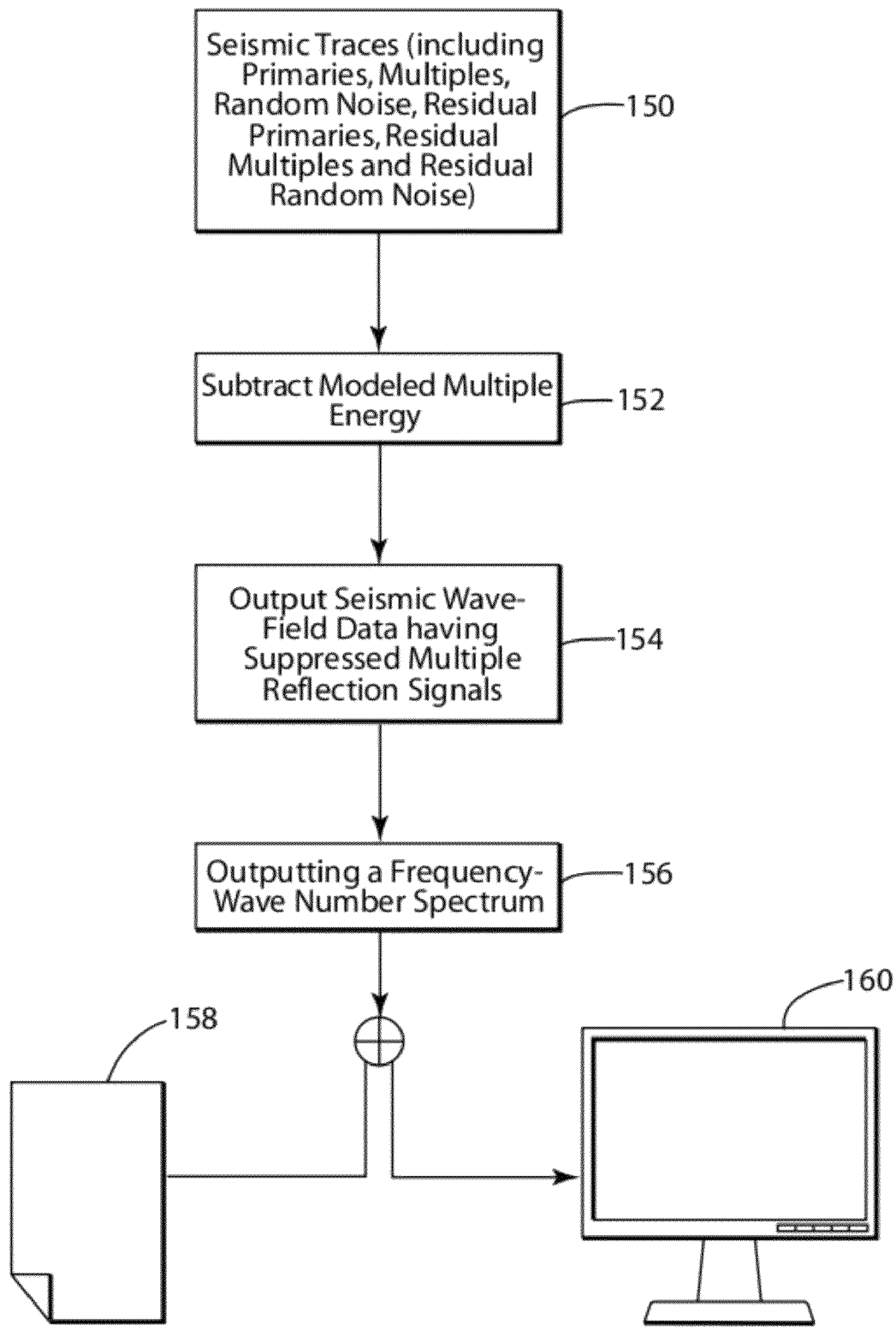
FIG. 2 is flow diagram for subtracting multiple reflection signals from the input data, i.e., gathers, in accordance with the present invention.
Figure 7:
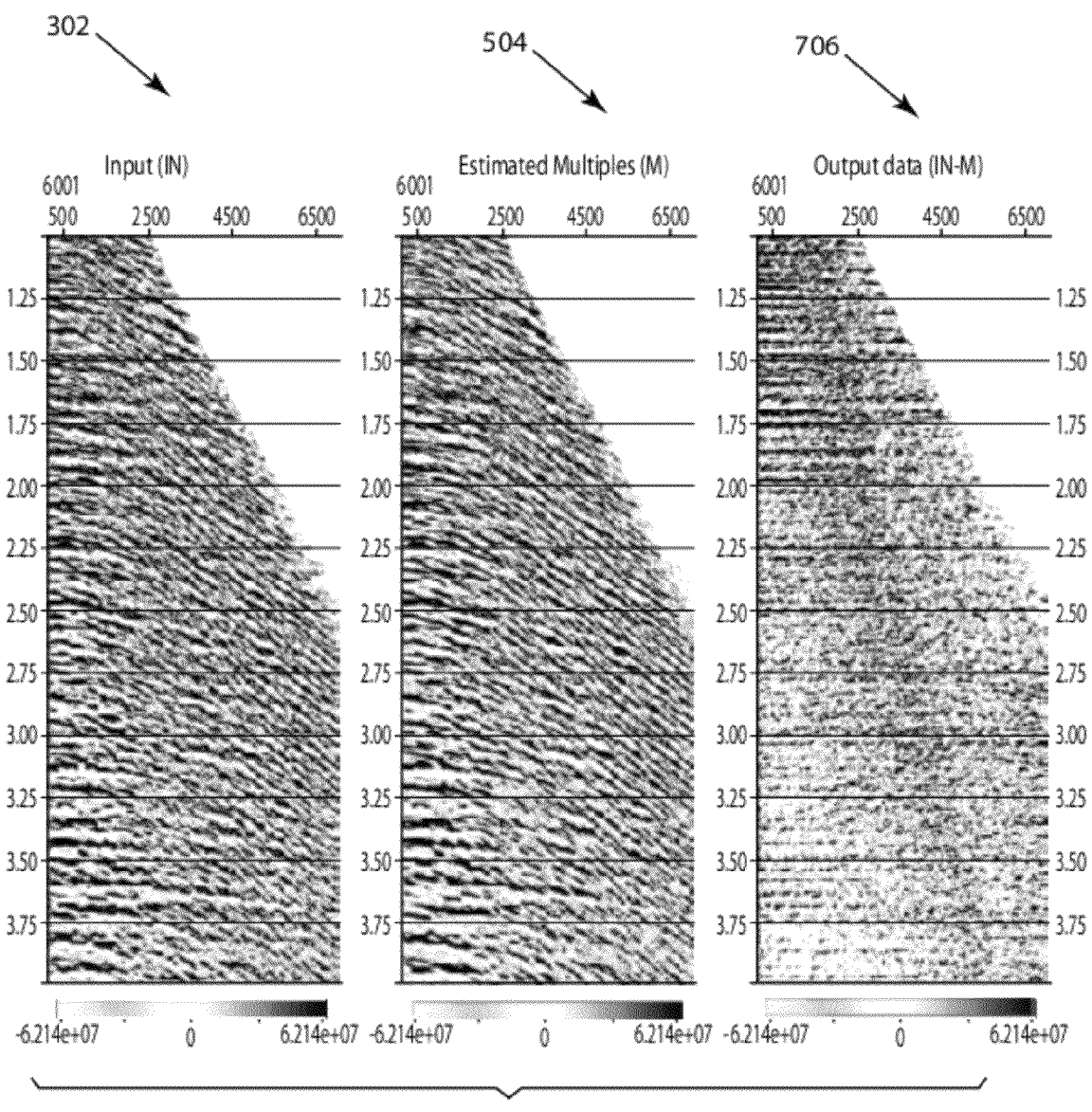
FIG. 7 illustrates the input gather, estimated multiple reflection signals and the output data based upon subtraction of the estimated multiples from the input data according to the method of the present invention.

Referring now to FIG. 2, a modeled set of seismic wave-field data having suppressed multiple reflection signals is obtained based upon the modeled multiple reflection signals. The modeled multiple reflection signals are subtracted 152 from the input data, in the form of seismic traces 150 including primary reflection signals, multiple reflection signals, random noise signals, residual primary reflection signals, residual multiple reflection signals and residual random noise signals, to provide 154 seismic wave-field data having suppressed multiple reflection signals. For visualization of the data, an FK spectrum may be outputted 156, for instance, to printed medium 158 or to an electronic display 160. The removal of the modeled multiples from the input data is illustrated in FIG. 7, which shows gathers of the estimated multiple reflection signals M 504 subtracted from the input data IN 302 to provide the output data 706, i.e., seismic wave-field data having suppressed multiple reflection signals. The residual data is included in the output data IN-M 706.

Figure 8:
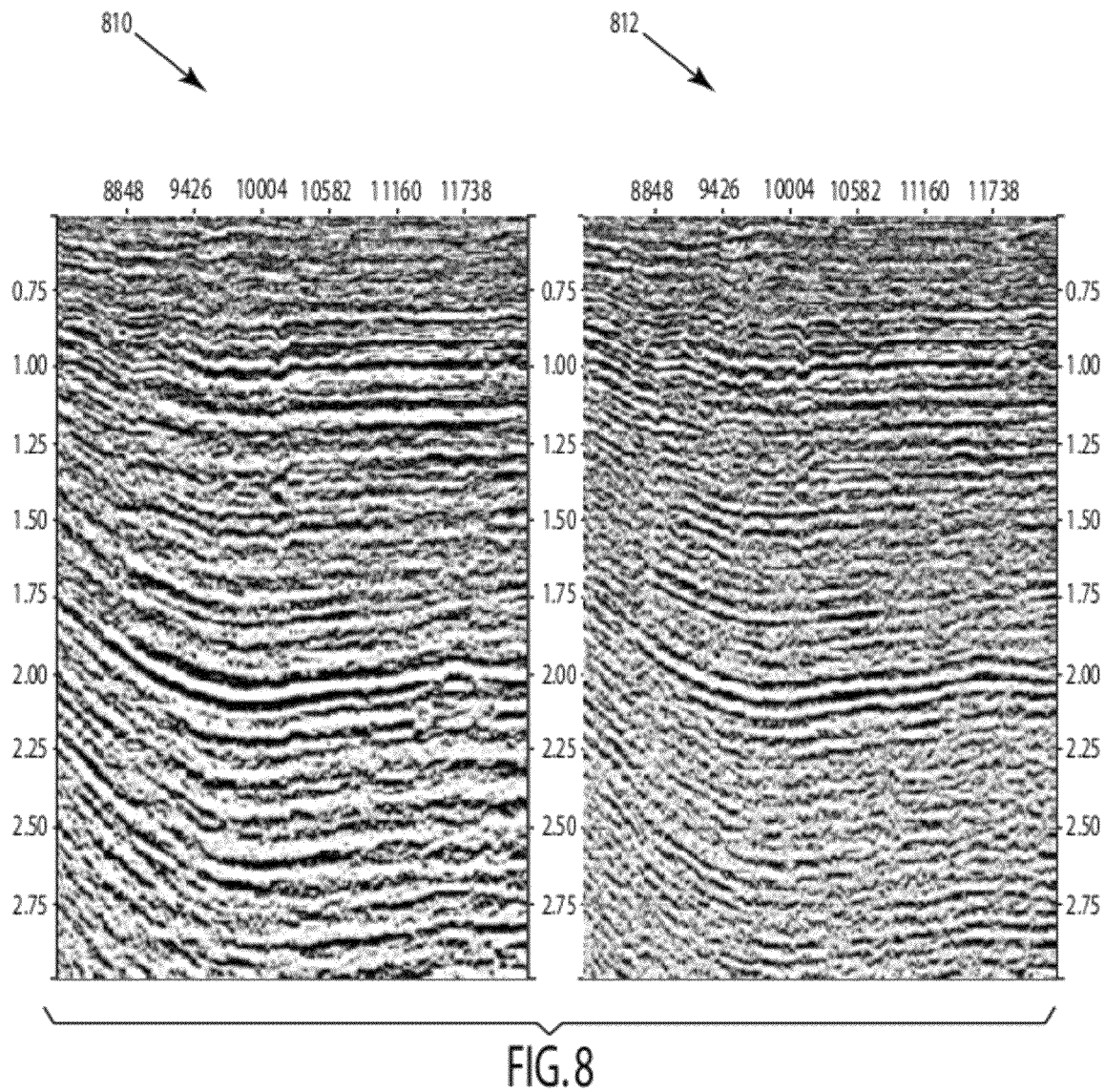
FIG. 8 shows a portion of stacked sections of the original stack section and the stack section with multiple reflection signals suppressed by the method of the present invention.

Referring now to FIG. 8, a stacked section 810 derived from the data 102, 302 without multiple suppressions compared to a stacked section 812 derived according to the methods of the present invention described in detail above with respect to FIGS. 1, 2 and 7, i.e., data 154, 706. The ordinate is time in seconds, and the abscissa is the common middle point value. The section 810 has strong multiple reflection signals, generally below 0.75 seconds, and lower time resolution, i.e., low apparent frequency, than section 812. In the pre-stack gather, multiples are not flattened as in M 504. When the multiple reflection signals were stacked, they demonstrated lower frequency as compared to normal primary reflection signals. Moreover, multiple reflection signals often interfered with primary reflection signals, which could mislead those interpreting the data with respect to the correct geological layers or structures.

Figure 9:
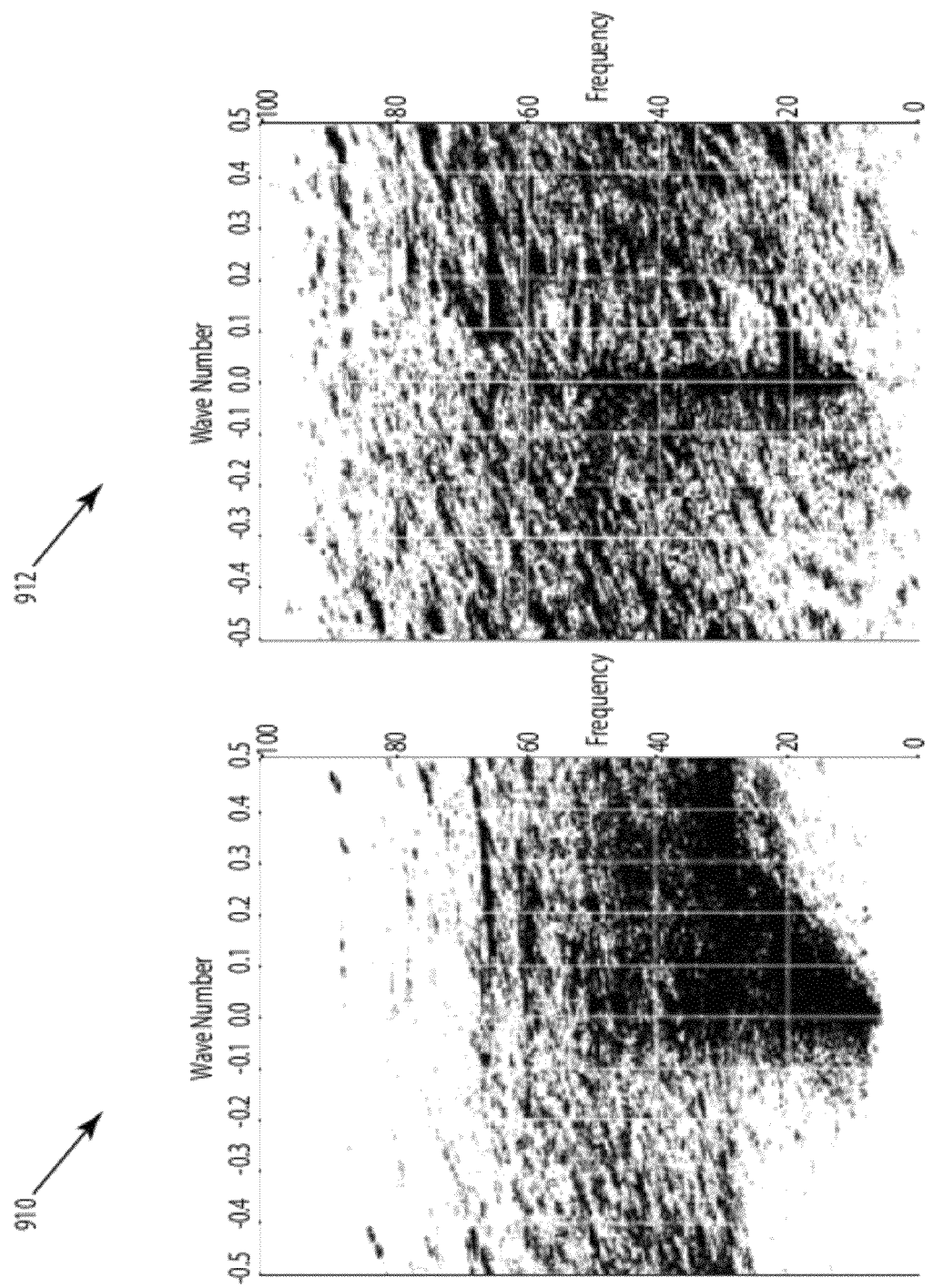
FIG. 9 shows a comparison of an FK spectrum of the input gather and the FK spectrum of the output gather derived from the method of suppressing multiple reflection signals of the present invention.

Referring now to FIG. 9, a frequency-wavenumber (FK) spectrum 910 based on data represented in gather 302, i.e., the input gather, is compared to an FK spectrum based on data represented in gather 706, i.e., the output gather derived from the process of the present invention. Note that the strong energy on the right part of FK spectrum 910 represented the multiple reflection signals in the time domain, data 504. The FK spectrum 912 demonstrated that the multiple reflection signals were removed. Therefore, using the process of the present invention, the FK spectrum is more balanced.

Compared to conventional methods such as those based on a Radon transform, the present invention provides a more accurate and reliable modeling of the multiples, particularly data derived from land-based sources. The conventional methods for multiple suppression typically assume that the seismic data (T) has two components: multiples (M) and non-multiples (O), where T=M+O. The input data (t) is transformed to the Radon domain by Radon transform. The multiple reflection signals are modeled in the Radon domain, and then transformed back to the time domain. A notable detriment to the conventional Radon method is that in the Radon domain, the zone of multiple reflection signals and the zone of random noise signals overlap. Therefore, the modeled multiple reflection signals not only include multiples, but also include overlapping random noise signals. In addition, the Radon transform is a full data transform, and when a sample is muted to model multiple reflection signals, all data is affected, resulting in data smearing.

However, the present invention provides a method that assumes a more realistic model for seismic data. As described above, the method decomposes the seismic wave-field (T) into four main components: primary reflection signals (P), multiple reflection signals (M), random noise signals (N), and residuals of the primary reflection signals, the multiple reflection signals and the random noise signals (R=RP+RN+RM), such that the seismic wave-field is represented by: T=P+M+N+R.

In a preferred method, a localized, small window FK domain method, i.e., about 32-64 traces and 500-1000 milliseconds, is used to separate main random noise from the input data. The data with main random noise removed is passed to the next step, whereby the main primary reflection signals are separated by using localized (small window) FK filtering and weighted median filtering. The data with main random noise and main primary reflection signals removed is passed to a third step, whereby a localized parabolic path-summation method is used to model the energy of the multiple reflection signals. The localized parabolic path-summation method processes the multiple reflection signals on a sample-by-sample basis, in which energy of the multiple reflection signals is calculated for a single sample and the process repeated for each sample. A parabolic path is identified from a plurality of parabolic paths to match the multiple reflection signals of the localized dataset. The values of points of the identified parabolic path are interpolated from the points of the cross parabolic path and adjacent traces of the localized dataset.

Finally, to obtain an accurate set of wave-field data, the modeled multiple reflection signals are removed from the input data and the result is the output. Examples of actual processed data are shown to illustrate that the method of the present invention can more accurately preserve both the amplitude and frequency of the primary reflection signals while effectively suppressing the multiple reflection signals.

This method removes the main random noise signal energy and the main primary signal energy before modeling multiples and preferably utilizes localized method, such as parabolic path-summation, to separate multiple reflection signals. This results in less data smearing and maintains the original data characteristics. Thus, the method herein is based on localized data transforms, whereas conventional methods are based on full data transforms.

The method of the present invention preferably uses a localized transform, such as small window transform, to estimate noise and primary energy. For modeling multiple energy, the localized parabolic path-summation method works on time-offset (T-X) domain, sample by sample, trace by trace, and accordingly the need for use of transforms as in conventional data modeling is obviated. The method herein minimizes the data smearing problem and obtains more accurate estimates of multiple reflection signals.

In a preferred embodiment, the method of the invention uses data that includes velocity discrimination between primary reflection signals and multiple reflection signals. In a further preferred embodiment, the input data is corrected to compensate for increased travel time as sensors are further removed from the sources, known as "normal moveout" or "NMO" correction using common middle point or common image gathers.

The foregoing embodiments of methods according to the various aspects of the invention may be performed by a suitably programmed general purpose computer. One or more of the various steps of the process can be executed by modules of a computer program. An example of such a computer includes a central processor (which may be a single processor or multiple processors) coupled to one or more displays. A computer program according to this aspect of the invention may reside on any one or more of a number of types of computer readable medium, such as an optical disk, flash memory, or a magnetic disk insertable into a suitable media reader coupled to the processor. The program may reside on a hard drive within or remote from the processor. In addition, the input data may reside on any one or more of a number of types of computer readable media, which may be the same or different than the computer readable medium upon which the computer program resides. Furthermore, the modeled multiple reflection signals and the wave-field model generated based upon the modeled multiples may be outputted to any one or more of a number of types of computer readable medium or to a printed medium.

Figure 10A:
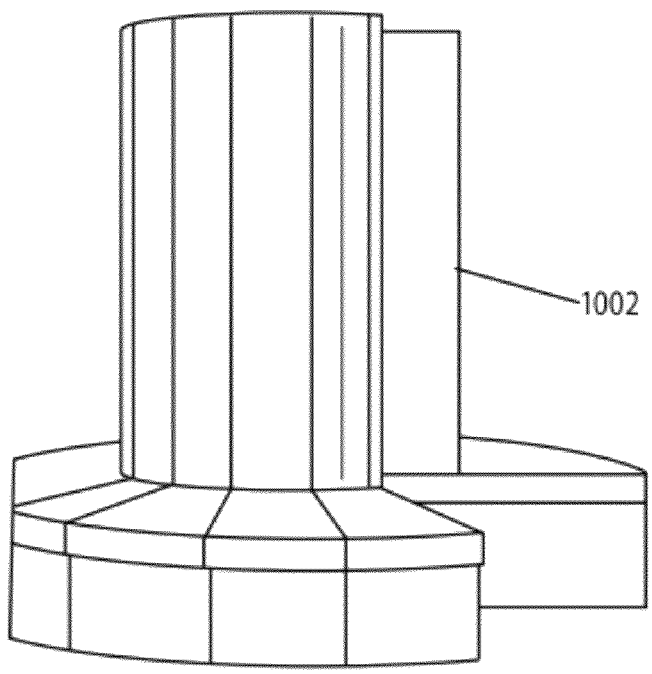
FIGS. 10A and 10B show exemplary embodiments of computer apparatus for carrying out the present invention.

In certain embodiments, and referring to FIG. 10A, one example of a computer suitable for implementing the method of the present invention is in the form of a supercomputer 1002, e.g., a supercomputer available from Cray, Inc. of Seattle Wash. such as a CRAY-1M.

Figure 10B:
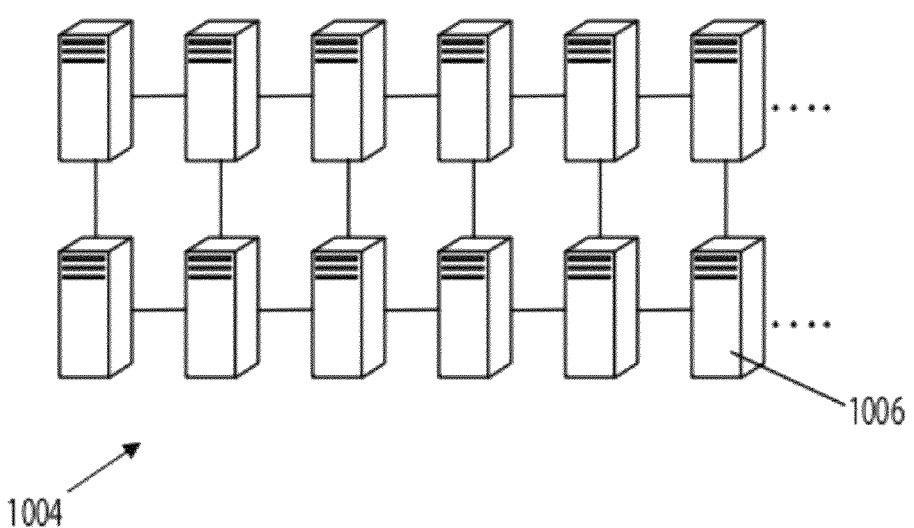

In additional embodiments, and referring to FIG. 10B, the processing for the program of the present invention can be carried out in a cluster 1004 of computers 1006, where the individual computers may be in the same facility, or distributed over a large scale area such as throughout a corporate enterprise campus or a university campus, or geographically located among plural corporate enterprise campuses, plural university campuses, located in one or more states or nations.

The program includes logic operable to cause a programmable computer to perform the data processing sequences described above with reference to FIGS. 1 and 2. This logic can be arranged in suitable program modules and optionally sub-modules that generally correlate with the process described above with reference to FIGS. 1 and 2. The computer program code for carrying out the data processing sequences described above with reference to FIGS. 1 and 2 can be stored in a storage medium, loaded into and/or executed by a computer, or transmitted over some transmission medium, such as over electrical wiring or cabling, through fiber optics, via electromagnetic radiation or via the Internet, wherein, when the computer program code is loaded into and executed by a computer, the computer becomes an apparatus for practicing the invention. When implemented on a general-purpose microprocessor, the computer program code segments configure the microprocessor to create specific logic circuits.

The method and system of the present invention have been described above and in the attached drawings; however, modifications will be apparent to those of ordinary skill in the art and the scope of protection for the invention is to be defined by the claims that follow.

The invention claimed is:

1. A system for modeling seismic wave-field data in order to suppress near-surface and sub-surface related multiples from reflection signals that include main primary reflection signals, main random noise signals, main multiple reflection signals, residual primary reflection signals, residual random noise signals, and residual multiple reflection signals, the system comprising a computer to receive such data, said computer being programmed to:

a. model main random noise and separate main random noise signals from the reflection signals using a frequency-wavenumber domain method to provide data having suppressed main random noise signals;

b. model main primary reflection signals and separate main primary reflection signals from the data having suppressed main random noise using both frequency-wavenumber filtering in a frequency-wavenumber domain and weighted median filtering in a time-offset domain to provide data having suppressed main random noise and suppressed main primary reflections;

c. model multiple reflection signals using parabolic path summation on the data having suppressed main random noise and main primary reflections; and d. subtract the modeled multiple reflection signals from the collected or stored reflection signal to provide seismic wave-field data having suppressed multiple reflections.

2. The system of claim 1, wherein said computer is further programmed to:

e. output a frequency-wavenumber spectrum derived from the seismic wave-field data having suppressed multiple reflections.

3. The system of claim 1, wherein the steps (a)-(c) are performed on localized datasets.

4. The system of claim 3, wherein said computer is programmed to identify a parabolic path from a plurality of parabolic paths to match the multiple reflection signals of the localized dataset, and to interpolate values of points that cross points of the identified parabolic path and adjacent traces of the localized dataset.

5. A system for modeling seismic wave-field data in order to suppress near-surface and sub-surface related multiple reflection signals using reflection signals including main random noise signals, main multiple reflection signals, main primary reflection signals, residual random noise signals, residual multiple reflection signals and residual primary reflection signals, the system comprising:

a memory;

a processor;

a first module executable by the processor and adapted to model main random noise and separate main random noise signals from the reflection signals using a frequency-wavenumber domain method to provide and store in memory data having suppressed main random noise;

a second module executable by the processor and adapted to model main primary reflection signals and separate main primary reflection signals from the data having suppressed main random noise using both frequency-wavenumber filtering in a frequency-wavenumber domain and weighted median filtering in a time-offset domain to provide and store in memory data having suppressed main random noise and main primary reflections;

a third module executable by the processor and adapted to model and store in memory multiple reflection signals using parabolic path summation for the data having suppressed main random noise and suppressed main primary reflections; and a fourth module executable by the processor and adapted to subtract the modeled multiple reflection signals from the reflection signals to provide and store in memory seismic wave-field data having suppressed multiple reflections.

6. The system as in claim 5, further comprising a fifth module executable by the processor and adapted to output and store in memory a frequency-wavenumber spectrum derived from the reflection signal having suppressed multiple reflections.

* * * * *